United States Patent [19]
Kamin et al.

[11] Patent Number: 5,224,285
[45] Date of Patent: Jul. 6, 1993

[54] MODIFIED FISHING LURES

[76] Inventors: Sam Kamin, 6500 Sandspoint #513, Houston, Tex. 77074; George Spector, 233 Broadway Room 702, New York, N.Y. 10279

[21] Appl. No.: 767,865
[22] Filed: Sep. 30, 1991
[51] Int. Cl.⁵ ............................................. A01K 85/00
[52] U.S. Cl. ............................ 43/42.06; 43/42.09; 43/42.31; 43/17.6
[58] Field of Search ............... 43/42.06, 42.09, 17.6, 43/42.31, 42.35

[56] References Cited

U.S. PATENT DOCUMENTS

| | | | |
|---|---|---|---|
| 2,529,642 | 11/1950 | Vaughn et al. | 43/42.09 |
| 2,560,733 | 7/1951 | Morris | 43/42.06 |
| 2,764,834 | 10/1956 | Klein | 43/42.09 |
| 2,996,826 | 8/1961 | Lamar | 43/42.09 |
| 3,087,273 | 4/1963 | Nurme | 43/42.06 |
| 3,260,011 | 7/1966 | Reamy | 43/42.09 |
| 3,762,092 | 10/1973 | Bercz et al. | 43/17.6 |
| 4,337,591 | 7/1982 | Gell et al. | 43/42.09 |
| 4,435,914 | 3/1984 | Norman | 43/42.31 X |
| 4,823,497 | 4/1989 | Pierce | 43/17.6 |

Primary Examiner—Kurt C. Rowan

[57] ABSTRACT

An improved fishing lure is provided which consists of an elongated body having a chamber therein. Bait is to fit into the chamber of the elongated body. A mechanism is on the elongated body, for allowing the bait to enter into the chamber of the elongated body. At least one fishing hook assembly is attached to the elongated body.

5 Claims, 3 Drawing Sheets

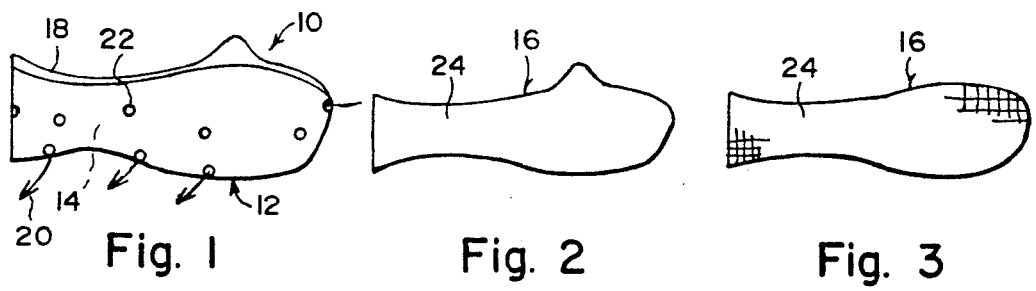
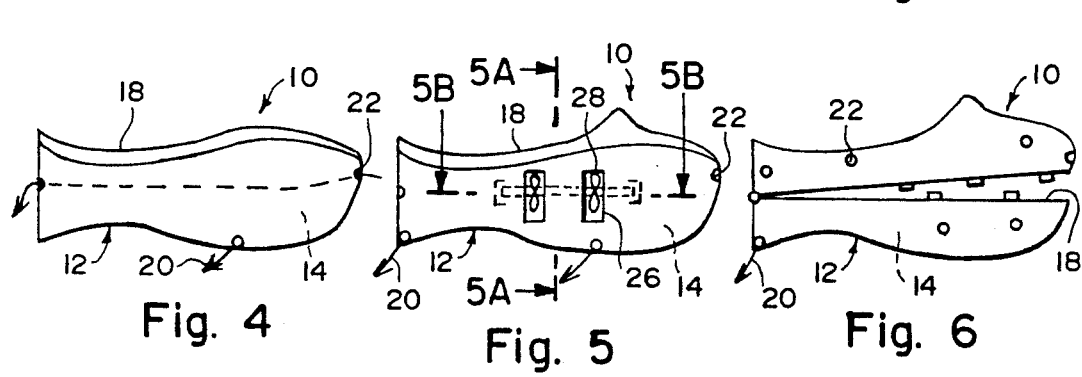
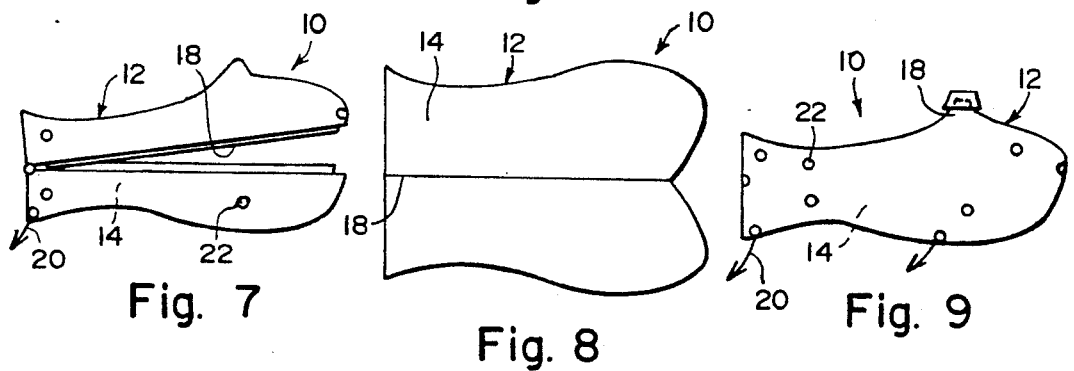
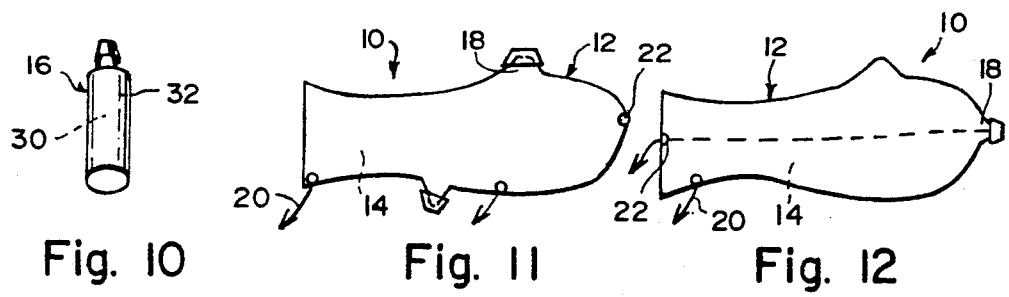

MODIFIED FISHING LURES

BACKGROUND OF THE INVENTION

The instant invention relates generally to fishing lures and more specifically it relates to an improved fishing lure which provides a body that has a cavity to receive various types of bait therein.

There are available various conventional fishing lures which do not provide the novel improvements of the invention herein disclosed.

SUMMARY OF THE INVENTION

A primary object of the present invention is to provide an improved fishing lure that will overcome the shortcomings of the prior art devices.

Another object is to provide an improved fishing lure in which the body has a cavity to receive various types of bait therein to attract fish to be caught.

An additional object is to provide an improved fishing lure in which the insertable bait can be in a variety of colors, dead bait, live, bait, essences, colored liquids and flutterances by propeller action and the like.

A further object is to provide an improved fishing lure that is simple and easy to use.

A still further object is to provide an improved fishing lure that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a diagrammatic perspective view of a lure with an envelope slit opening.

FIG. 2 is a diagrammatic side view of a colored plate.

FIG. 3 is a diagrammatic side view of a fiber insert.

FIG. 4 is a diagrammatic perspective view of the lure with a line therethrough for strength.

FIG. 5 is a diagrammatic perspective view of the lure with a snap in propeller assembly.

FIG. 6 is a diagrammatic side view of a snap open lure.

FIG. 7 is a diagrammatic side view of another type of snap open lure.

FIG. 8 is a diagrammatic top view of an oyster type snap open lure.

FIG. 9 is a diagrammatic side view of a lure with a fin entry port with cap.

FIG. 10 is a perspective view of a squeeze bottle containing liquid to be inserted within the lure shown in FIG. 9.

FIG. 11 is a diagrammatic side view of a clear lure with a fin entry port and a drain cap.

FIG. 12 is a diagrammatic side view of a clear lure with a front entry port.

DETAILED DESCRIPTION OF THE PREFERRED EMBODIMENTS

Figure 13:
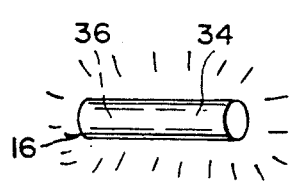
FIG. 13 is a perspective view of a sealed container with a luminous substance which can be inserted within the lure.

Turning now descriptively to the drawings, in which similar reference characters denote similar elements throughout the several views, the Figures illustrate an improved fishing lure 10 which consists of an elongated body 12 having a chamber 14 therein, with bait 16 to fit into the chamber 14 of the elongated body 12. A mechanism 18 is on the elongated body 12, for allowing the bait 16 to enter into the chamber 14 of the elongated body 12. At least one fishing hook assembly 20 is attached to the elongated body 12.

Figure 14:
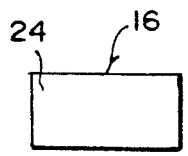
FIG. 14 is a front view of a compacted slow release essence panel.
Figure 15:
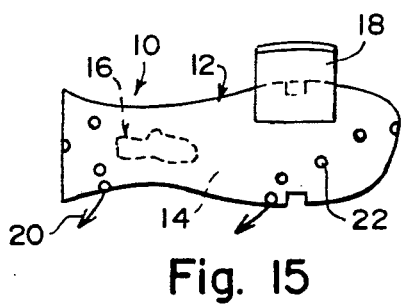
FIG. 15 is a diagrammatic side view of a lure with a hatchway opening.

The elongated body 12 is transparent and has a plurality of small apertures 22 therethrough. As best seen in FIGS. 2, 3 and 14, bait 16 can be a colored panel 24 that may have a distinctive odor to attract fish, which can be inserted through the bait allowing mechanism 18.

Figure 5A:
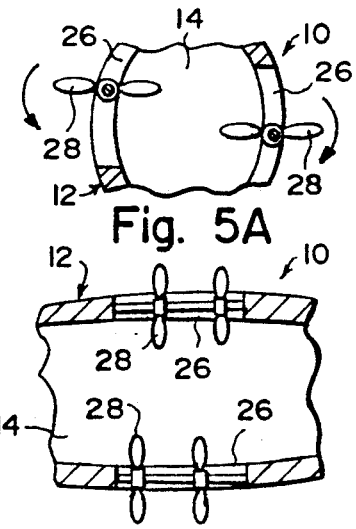
FIG. 5A is a cross sectional view taken along line 5A—5A in FIG. 5, showing a modification of the propeller assembly.
Figure 5B:
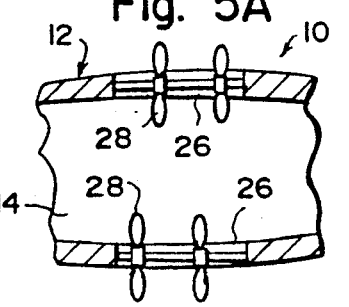
FIG. 5B is a cross sectional view taken along line 5B—5B in FIG. 5, showing the modification in FIG. 5A.

As shown in FIGS. 5, 5A and 5B, the elongated body 12 can have at least one large window aperture 26 on its side and at least one propeller assembly 28 mounted in the at least one large window aperture 26 to create distortions within the water to mimic a wounded bait.

The bait 16 can be a colored liquid 30 in a container 32, as shown in FIG. 10, that may have a distinctive odor to attract fish, which can be inserted through the bait allowing mechanism 18 in FIGS. 9, 11 and 12. The bait 16 can also be a sealed container 34 with a luminous substance 36 therein, as shown in FIG. 13, to attract fish, which can be inserted through the bait allowing mechanism 18.

Figure 16:
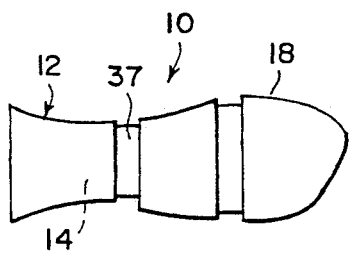
FIG. 16 is a diagrammatic side view of a lure with rubber bands thereabout.
Figure 17:
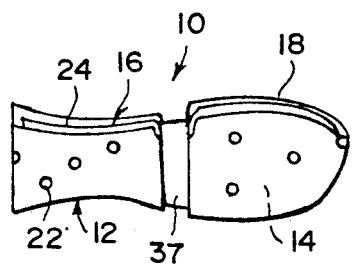
FIG. 17 is a diagrammatic perspective view of a lure with an envelope opening with rubber bands.
Figure 18:
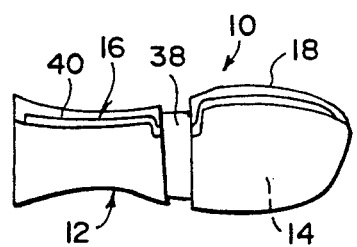
FIG. 18 is a diagrammatic perspective view of a lure with a flotation insert held by a rubber band.
Figure 19:
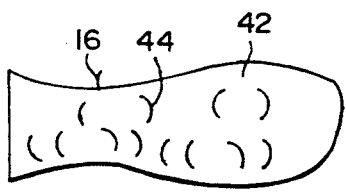
FIG. 19 is a diagrammatic side view of a lure with offset opening for creating a wiggle thereto.
Figure 20:
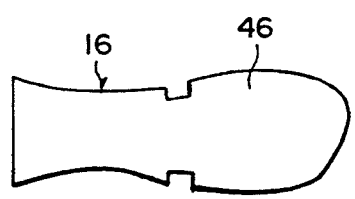
FIG. 20 is a diagrammatic side view of a weighted plate insert for the lure in FIG. 18.
Figure 21:
FIG. 21 is a diagrammatic side view of a propeller assembly with an offset axle to create a turbulence wiggle.
Figure 22:
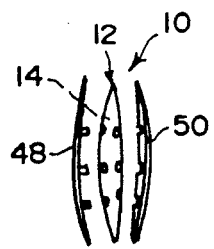
FIG. 22 is a diagrammatic exploded front view showing male snap and female snap plates to the lure.
Figure 23:
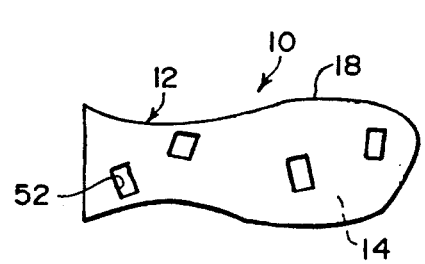
FIG. 23 is a diagrammatic side view of a lure with opposing fluted openings to create agitated movement.

Rubber bands 37, as shown in FIG. 16 and 17 and a VELCRO strap 38 in FIG. 18, can help seal the mechanism 18. The bait 16 can also be an air flotation insert 40 in FIG. 18, a wiggle plate insert 42 with offset openings 44 in FIG. 19 or a weighted plate insert 46 in FIG. 20. The propeller assembly 28, as shown in FIG. 21 can be offset to create a turbulence wiggle. The elongated body 12 in FIG. 22 can have a male snap attachment 48 and a female snap attachment 50. The elongated body 12 in FIG. 23 can also have opposing fluted openings 52 to also create an agitated movement.

Figure 24:
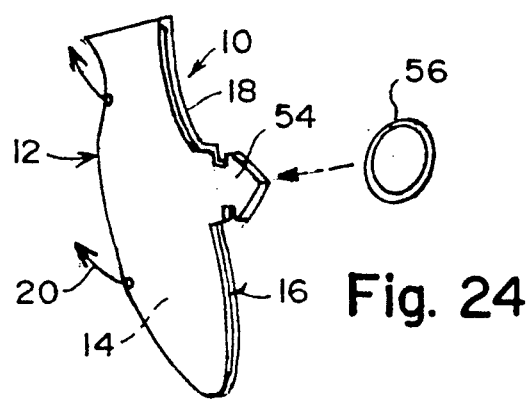
FIG. 24 is a diagrammatic top perspective view of a lure with a notched fin ready to accommodate a rubber band for closure.
Figure 25:
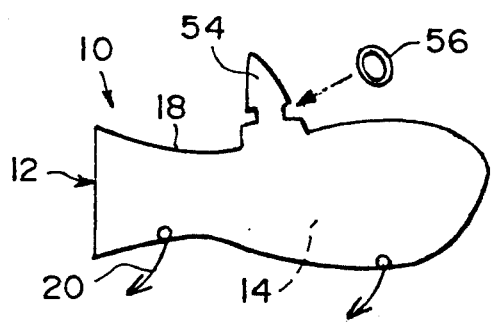
FIG. 25 is a diagrammatic side view of the lure in FIG. 24, with the rubber band removed.
Figure 26:
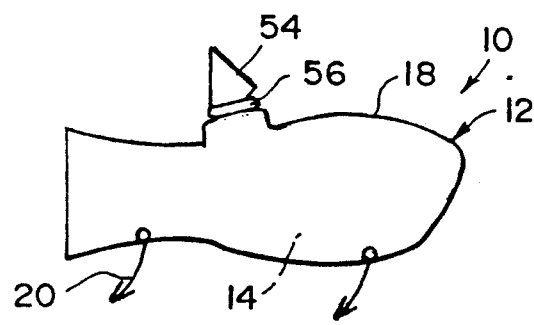
FIG. 26 is a diagrammatic side view of the lure in FIG. 24, with the rubber band on the notched fin.

The improved fishing lure 10, as shown in FIGS. 24, 25 and 26 further includes a notched fin 54 formed on the elongated body 12. A rubber band 56 fits over the notched fin 54 to close the bait allowing mechanism 18 to retain the bait 16 within the chamber 14 of the elongated body 12.

Figure 27:
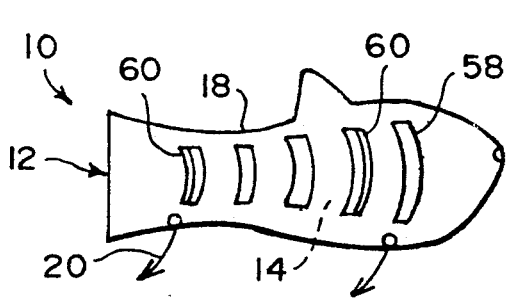
FIG. 27 is a diagrammatic side view of a lure with fluted ribbed openings on each side to create a wiggle and turbulence in the lure.

The elongated body 12 of the improved fishing lure 10, as shown in FIG. 27 further has a plurality of ribbed openings 58 on each side with fluted outer edges 60 that can be turned outward and inward to create a wiggle and a turbulence in the lure 10 for releasing an odor from the bait 16.

Figure 28:
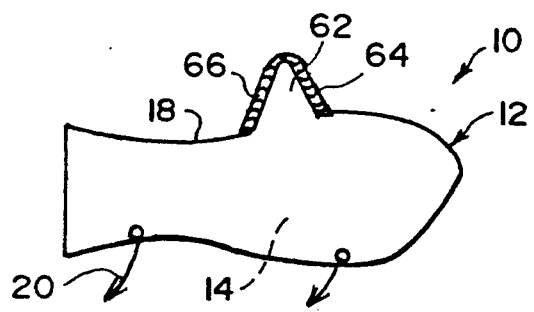
FIG. 28 is a diagrammatic side view of a lure with a furled shaped fin to create a turbulence in the lure.

The improved fishing lure 10, as shown in FIG. 28, further includes a knurled shaped fin 62 formed on the elongated body 12. The knurled shaped fin 62 has a forward edge 64 knurled in one direction and a rearward edge 66 furled in an opposite direction to create a turbulence in the lure 10.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:
1. An improved fishing lure which comprises:
a) an elongated body having a chamber therein;
b) bait to fit into said chamber of said elongated body;
c) means on said elongated body, for allowing said bait to enter into said chamber of said elongated body; and
d) at least one fishing hook assembly attached to said elongated body; wherein said elongated body is transparent and has a plurality of small apertures therethrough; wherein said bait is a colored panel which has a distinctive odor to attract fish, which is inserted through said means for allowing bait to enter said chamber;
e) said elongated body having at least one window aperture on its side; and
f) at least one propeller assembly with blades mounted in said window aperture said blades projecting outwardly of said apertures to create distortions within the water to mimic a wounded bait.
2. A fishing lure as in claim 1, wherein a plurality of propellers are mounted offset in said apertures to provide a wiggle effect.
3. A fishing lure as in claim 1, having opposing longitudinal body sections with opposing notched fins for receiving elastic band to retain said body in a closed position.
4. An improved fishing lure as recited in claim 1, wherein said elongated body further having a plurality of ribbed openings on each side with fluted outer edges to create a wiggle and a turbulence in said lure for releasing an odor from said bait.
5. An improved fishing lure as recited in claim 1, further including a knurled shaped fin formed on said elongated body, said knurled shaped fin having a forward edge knurled in one direction and a rearward edge knurled in an opposite direction to create a turbulence about said lure.

* * * * *